United States Patent
Miyazaki

(10) Patent No.: US 9,334,393 B2
(45) Date of Patent: *May 10, 2016

(54) RUBBER COMPOSITION FOR FIBER CORD TOPPING, AND PNEUMATIC TIRE

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/148,138

(22) Filed: Jan. 6, 2014

(65) Prior Publication Data

US 2014/0206809 A1    Jul. 24, 2014

(30) Foreign Application Priority Data

Jan. 21, 2013   (JP) .................................. 2013-008525

(51) Int. Cl.
| | |
|---|---|
| *C08L 7/00* | (2006.01) |
| *C08L 21/00* | (2006.01) |
| *C08K 3/22* | (2006.01) |
| *C08K 3/06* | (2006.01) |
| *B60C 1/00* | (2006.01) |

(52) U.S. Cl.
CPC .................. *C08L 7/00* (2013.01); *B60C 1/0041* (2013.04); *C08K 3/06* (2013.01); *C08K 3/22* (2013.01); *C08L 21/00* (2013.01); *B60C 2001/005* (2013.04); *B60C 2001/0083* (2013.04); *Y02T 10/862* (2013.01)

(58) Field of Classification Search
CPC ......... C08L 7/00; C08L 21/00; B60C 1/0041; B60C 2001/0083; B60C 2001/005; C08K 3/22; C08K 3/06; Y02T 10/862
USPC .................................................... 524/432, 418
See application file for complete search history.

(56) References Cited

U.S. PATENT DOCUMENTS

| | | | | |
|---|---|---|---|---|
| 4,567,928 | A * | 2/1986 | Takiguchi | .................. 152/209.1 |
| 2006/0266459 | A1 * | 11/2006 | Miyazaki | ...................... 152/565 |

FOREIGN PATENT DOCUMENTS

| | | |
|---|---|---|
| JP | 2006-328194 A | 12/2006 |
| JP | 2008-31427 A | 2/2008 |

* cited by examiner

*Primary Examiner* — Angela C Scott
(74) *Attorney, Agent, or Firm* — Birch, Stewart, Kolasch & Birch, LLP

(57) ABSTRACT

The present invention provides a rubber composition for a fiber cord topping which is capable of improving handling stability, fuel economy, elongation at break, adhesion to fiber cords, processability, and tire durability in a balanced manner, and also provides a pneumatic tire formed from the rubber composition. The present invention relates to a rubber composition for a fiber cord topping, having an amount of insoluble sulfur with an iron content of not more than 30 ppm, calculated as net sulfur in the insoluble sulfur, of 1.0 to 3.5 parts by mass; a total net sulfur content of 2.0 to 3.5 parts by mass; and a zinc oxide content of 1.5 to 6.0 parts by mass, each per 100 parts by mass of a rubber component of the rubber composition.

6 Claims, No Drawings

RUBBER COMPOSITION FOR FIBER CORD TOPPING, AND PNEUMATIC TIRE

TECHNICAL FIELD

The present invention relates to a rubber composition for a fiber cord topping, and a pneumatic tire formed from the rubber composition.

BACKGROUND ART

Rubber compositions for fiber cord toppings are required to improve in the properties such as handling stability, fuel economy, elongation at break, adhesion to fiber cords, and processability in a balanced manner.

As a method for improving these properties, for example, Patent Literature 1 discloses the use of a crosslinkable resin such as a modified resorcin resin. However, there is an arising demand for the development of a technique that can reduce the use of crosslinkable resins in view of the cost and environmental concerns. Yet, a reduced use of crosslinkable resins unfortunately decreases adhesion to fiber cords, thus decreasing tire durability.

Meanwhile, typical rubber compositions for fiber cord toppings contain insoluble sulfur, and 80% by mass or more of the insoluble sulfur remains unconverted to soluble sulfur even after the rubber kneading process. Such insoluble sulfur is present in the form of particles suspended in the rubber composition, or in the form of being adsorbed on substances such as zinc oxide particles, carbon black, and silica. On the other hand, conversion of a large amount of insoluble sulfur to soluble sulfur before vulcanization would unfortunately cause blooming of sulfur to the surface of the fiber cord topping rubber, thus decreasing building tack to deteriorate processability (extrusion processability) and adhesion to fiber cords (in a brand new state and after wet heat degradation), and also causing bulging and separation in the tire to lower the tire durability. Thus, it is important to prevent blooming of sulfur to improve the above properties in a balanced manner. Blooming herein refers to a phenomenon where sulfur is migrated to and deposited on the surface of a rubber composition like blooming flowers.

A technique of using a large amount of zinc oxide has been generally employed to prevent such blooming of sulfur; however, the zinc oxide contained in rubber compositions for tires has been a recent concern in terms of environmental pollution (particularly, plant growth inhibition), and the use of a smaller amount of zinc oxide is thus desired.

As described above, there is a demand for a technique that can improve the handling stability, fuel economy, elongation at break, adhesion to fiber cords, processability, and tire durability in a balanced manner with smaller amounts of crosslinkable resins and zinc oxide.

CITATION LIST

Patent Literature

Patent Literature 1: JP-A 2006-328194

SUMMARY OF INVENTION

Technical Problem

The present invention aims to solve the above problems and provide a rubber composition for a fiber cord topping which is capable of improving the handling stability, fuel economy, elongation at break, adhesion to fiber cords, processability, and tire durability in a balanced manner, as well as a pneumatic tire formed from the rubber composition.

Solution to Problem

The present inventor earnestly studied techniques to obtain a high performance rubber composition for a fiber cord topping with smaller amounts of crosslinkable resins and zinc oxide. As a result, the present inventor has found that the iron content in insoluble sulfur is associated with the above properties. The present inventor also has found that the above properties can be more suitably improved by using a specific amount of insoluble sulfur having a low iron content and, at the same time, limiting the total net sulfur content and the zinc oxide content to specific amounts. Thus, the present invention has been completed.

Specifically, the present invention relates to a rubber composition for a fiber cord topping, having an amount of insoluble sulfur with an iron content of not more than 30 ppm, calculated as net sulfur in the insoluble sulfur, of 1.0 to 3.5 parts by mass; a total net sulfur content of 2.0 to 3.5 parts by mass; and a zinc oxide content of 1.5 to 6.0 parts by mass, each per 100 parts by mass of a rubber component of the rubber composition.

The rubber composition for a fiber cord topping preferably has a combined amount of resorcinol resins, phenolic resins, and alkylphenolic resins of not more than 1.99 parts by mass, more preferably not more than 1.0 part by mass, per 100 parts by mass of the rubber component. Still more preferably, the rubber composition is substantially free of resorcinol resins, phenolic resins, and alkylphenolic resins.

The rubber composition for a fiber cord topping preferably has a softener content of not more than 1.99 parts by mass per 100 parts by mass of the rubber component.

The present invention also relates to a pneumatic tire, including a topped fiber cord component formed from the rubber composition.

The topped fiber cord component is preferably at least one of a carcass, a jointless band, and a canvas chafer.

Advantageous Effects of Invention

According to the present invention, the rubber composition for a fiber cord topping has an amount of insoluble sulfur with an iron content of not more than 30 ppm, calculated as net sulfur in the insoluble sulfur, of 1.0 to 3.5 parts by mass; a total net sulfur content of 2.0 to 3.5 parts by mass; and a zinc oxide content of 1.5 to 6.0 parts by mass, each per 100 parts by mass of a rubber component of the rubber composition. Thus, the present invention can improve the handling stability, fuel economy, elongation at break, adhesion to fiber cords, processability, and tire durability in a balanced manner; and can provide a pneumatic tire in which the handling stability, fuel economy, elongation at break, adhesion to fiber cords, and tire durability are improved in a balanced manner.

DESCRIPTION OF EMBODIMENTS

The rubber composition for a fiber cord topping of the present invention has an amount of insoluble sulfur with an iron content of not more than 30 ppm, calculated as net sulfur in the insoluble sulfur, of 1.0 to 3.5 parts by mass; a total net sulfur content of 2.0 to 3.5 parts by mass; and a zinc oxide content of 1.5 to 6.0 parts by mass, each per 100 parts by mass of a rubber component of the rubber composition.

The rubber composition of the present invention contains a specific amount of insoluble sulfur having a low iron content. This enables to improve the fuel economy, elongation at break (in a brand new state and after dry heat (oxidative) degradation), adhesion to fiber cords (in a brand new state and after wet heat degradation), processability (extrusion processability), and tire durability in a balanced manner while maintaining good handling stability (E*). The rubber composition may contain, in addition to the insoluble sulfur having a low iron content, soluble sulfur (for example, powdered sulfur, oil-treated sulfur, sulfur treated with zinc oxide, and other general sulfur products provided with anti-scattering properties) and insoluble sulfur having an iron content outside the above range. Still, the total amount of these sulfurs including the insoluble sulfur having a low iron content, i.e., the total net sulfur content, must be limited to a specific amount. The rubber composition also contains a specific amount of zinc oxide. Therefore, the rubber composition can provide a pneumatic tire in which the handling stability, fuel economy, elongation at break, adhesion to fiber cords, and tire durability are improved in a balanced manner.

Adhesion of a fiber cord topping rubber to fiber cords is relatively easily achieved as compared to the adhesion of a steel cord topping rubber to steel cords. Among fiber cords, nylon and aramid each containing an N—C=O group are defined as polyamides in a broad sense and show high adhesive reactivity to rubber. Meanwhile, polyester (PE) is treated through immersion in an aqueous dipping solution containing an agent (e.g. isocyanates) to promote adhesion in order to increase reaction activity of the fiber surface. However, such surface-treated PE still has poor reactivity with rubber, compared to polyamides. Thus, separation in the tire easily occurs due to a decrease in the adhesion induced by factors such as heat build-up, distortion, and oxidative degradation during driving, and migration of sulfur between the fiber cord topping rubber and adjacent components (particularly, clinch rubber, breaker cushion rubber, and sidewall rubber).

For this reason, conventional rubber compositions for fiber cord toppings contain crosslinkable resins in order to ensure good adhesion to fiber cords. In contrast, the present invention ensures good adhesion to fiber cords with a smaller amount of crosslinkable resins because of the structure described above, and provides a pneumatic tire in which the handling stability, fuel economy, elongation at break, adhesion to fiber cords, processability, and tire durability are improved in a balanced manner.

Examples of rubbers that can be used as the rubber component in the present invention include diene rubbers such as isoprene-based rubbers, butadiene rubber (BR), styrene-butadiene rubber (SBR), and styrene-isoprene-butadiene rubber (SIBR). These rubbers may be used alone or in combinations of two or more. Among these, isoprene-based rubbers and SBR are preferred in view of improving the handling stability, fuel economy, elongation at break, adhesion to fiber cords, processability, and reversion resistance in a balanced manner. A combined use of an isoprene-based rubber and SBR is more preferred.

Examples of isoprene-based rubbers include isoprene rubber (IR), natural rubber (NR), and epoxidized natural rubber (ENR). Among these, NR is preferred in view of obtaining excellent properties such as tire durability and adhesion to fiber cords. NR commonly used in the tire industry, such as SIR20, RSS#3, and TSR20, may be used. Any IR commonly used in the tire industry can be used.

The isoprene-based rubber content based on 100% by mass of the rubber component is preferably not less than 40% by mass, and more preferably not less than 60% by mass. If the content is less than 40% by mass, the elongation at break, fuel economy, adhesion to fiber cords, processability, and tire durability may be insufficient.

Also, the isoprene-based rubber content is preferably not more than 90% by mass, and more preferably not more than 80% by mass. If the content is more than 90% by mass, the handling stability and reversion resistance may be insufficient.

Any SBR commonly used in the tire industry, such as emulsion-polymerized styrene-butadiene rubber (E-SBR) and solution-polymerized styrene-butadiene rubber (S-SBR), can be used.

The SBR content based on 100% by mass of the rubber component is preferably not less than 10% by mass, and more preferably not less than 20% by mass. If the content is less than 10% by mass, the handling stability and reversion resistance may be insufficient.

Also, the SBR content is preferably not more than 60% by mass, and more preferably not more than 40% by mass. If the content is more than 60% by mass, the elongation at break, fuel economy, processability, and tire durability may be insufficient.

The rubber composition of the present invention contains insoluble sulfur having an iron content of not more than 30 ppm. This improves the fuel economy, elongation at break (in a brand new state and after dry heat (oxidative) degradation), adhesion to fiber cords (in a brand new state and after wet heat degradation), processability (extrusion processability), and tire durability in a balanced manner while maintaining good handling stability (E*). Thus, the effects of the present invention can be suitably achieved.

The iron content in the insoluble sulfur is not more than 30 ppm, preferably not more than 25 ppm, and more preferably not more than 20 ppm. If the content is more than 30 ppm, the effects of the present invention cannot be sufficiently achieved. The lower limit of the iron content is not particularly limited. Lower iron content is more preferred.

It should be noted that, if oil is combined with insoluble sulfur (i.e., in the case of oil-treated insoluble sulfur), the iron content in insoluble sulfur refers to the amount of iron relative to the total mass including insoluble sulfur and oil (i.e., relative to the mass of oil-treated insoluble sulfur).

The iron content in insoluble sulfur can be measured with an inductively coupled plasma (ICP) emission spectrometer.

The amount of the insoluble sulfur per 100 parts by mass of the rubber component is not less than 1.0 part by mass, preferably not less than 1.5 parts by mass, more preferably not less than 2.0 parts by mass, still more preferably not less than 2.5 parts by mass, and particularly preferably not less than 2.7 parts by mass. If the amount is less than 1.0 part by mass, the effects of the present invention cannot be sufficiently achieved. Also, the amount of the insoluble sulfur is not more than 3.5 parts by mass, preferably not more than 3.3 parts by mass. If the amount is more than 3.5 parts by mass, the elongation at break (particularly, the elongation at break after dry heat degradation) and tire durability will decrease.

Herein, the amount of the insoluble sulfur refers to the net sulfur amount in the insoluble sulfur. If oil-treated insoluble sulfur is used, the amount of the insoluble sulfur refers to the net sulfur amount in the oil-treated insoluble sulfur (i.e., the amount of sulfur in the oil-treated insoluble sulfur excluding the amount of oil).

As described above, the rubber composition of the present invention may contain, in addition to the insoluble sulfur having a low iron content, soluble sulfur (for example, powdered sulfur, oil-treated sulfur, sulfur treated with zinc oxide, and other general sulfur products provided with anti-scattering properties), and insoluble sulfur having an iron content outside the above range. In this case (as well as the case where only the insoluble sulfur having a low iron content is used), the total sulfur content must be as specified below.

The total sulfur content per 100 parts by mass of the rubber component is not less than 2.0 parts by mass, preferably not less than 2.2 parts by mass, more preferably not less than 2.5 parts by mass, still more preferably not less than 2.7 parts by mass, and particularly preferably not less than 2.8 parts by mass. If the content is less than 2.0 parts by mass, the handling stability, fuel economy, adhesion to fiber cords, and tire durability will decrease. Also, the total sulfur content is not more than 3.5 parts by mass, preferably not more than 3.3 parts by mass. If the content is more than 3.5 parts by mass, the sulfur will easily bloom, thus decreasing the fuel economy, elongation at break (particularly, elongation at break after dry heat degradation), and tire durability.

Herein, the total sulfur content refers to the total net sulfur amount in the sulfurs including the insoluble sulfur having a low iron content. Herein, the net sulfur amount is defined as follows: if oil-treated insoluble sulfur is used, it is the net sulfur amount in the oil-treated insoluble sulfur (i.e., the amount of sulfur in the oil-treated insoluble sulfur excluding the amount of oil).

The rubber composition of the present invention contains zinc oxide. This improves the adhesion to fiber cords, handling stability, fuel economy, elongation at break, and reversion resistance. Zinc oxide also temporarily adsorbs sulfur in the kneaded rubber composition (during kneading) and thus serves as a storage of sulfur, reducing blooming of sulfur. Examples of zinc oxide include those conventionally used in the rubber industry. Specific examples thereof include zinc oxide #1 and zinc oxide #2 available from MITSUI MINING & SMELTING CO., LTD.

The zinc oxide content per 100 parts by mass of the rubber component is not less than 1.5 parts by mass, preferably not less than 1.6 parts by mass, more preferably not less than 2.0 parts by mass, still more preferably not less than 2.2 parts by mass, particularly preferably not less than 2.5 parts by mass, and most preferably not less than 2.7 parts by mass. If the content is less than 1.5 parts by mass, the sulfur will easily bloom, decreasing the handling stability, fuel economy, elongation at break, adhesion to fiber cords, reversion resistance, and tire durability. Also, the zinc oxide content is not more than 6.0 parts by mass, preferably not more than 5.5 parts by mass, more preferably not more than 5.0 parts by mass, still more preferably not more than 4.5 parts by mass, particularly preferably not more than 4.0 parts by mass, and most preferably not more than 3.5 parts by mass. If the content is more than 6.0 parts by mass, it will have a negative impact on the environment.

The ratio of the zinc oxide content to the total net sulfur content is preferably not less than 0.50, more preferably not less than 0.70, still more preferably not less than 0.80, and particularly preferably not less than 0.90. If the ratio is less than 0.50, the sulfur will easily bloom, thus decreasing the processability (extrusion processability), adhesion to fiber cords (particularly after wet heat degradation), elongation at break (particularly after dry heat degradation), and tire durability.

The ratio is preferably not more than 4.00, more preferably not more than 3.00, still more preferably not more than 2.00, particularly preferably not more than 1.70, and most preferably not more than 1.50. If the ratio is more than 4.00, although it will then provide excellent properties in that blooming of sulfur can be more suitably prevented, agglomerates of undispersed zinc oxide, if any, may act as fracture nuclei under tension, thus decreasing the elongation at break. In this case, it is also impossible to achieve a reduction in the zinc oxide content; moreover, the cost and the weight of the resulting tire will increase (deterioration of the fuel economy of the tire) due to a large amount of zinc oxide having a high unit cost and a high specific gravity.

Satisfying the above ratio can inhibit zinc oxide from acting as fracture nuclei, thus providing good elongation at break and tire durability.

In the present invention, a specific amount of insoluble sulfur having a low iron content is used and, at the same time, the total net sulfur content and the zinc oxide content are limited to specific amounts. As a result, even if crosslinkable resins are used in a reduced amount or not used at all, good adhesion to fiber cords is ensured, and thus a pneumatic tire in which the handling stability, fuel economy, elongation at break, adhesion to fiber cords, and tire durability are improved in a balanced manner can be provided. It is also possible to contribute to cost efficiency and environmental protection because the amount of crosslinkable resins can be reduced.

Any crosslinkable resin can be used. Examples thereof include those commonly used in the tire industry, such as resorcinol resins, phenolic resins, and alkylphenolic resins. These crosslinkable resins may be formed from a plurality of different monomers or may have a modified end.

Examples of resorcinol resins include resorcinol-formaldehyde condensates. Specific examples include Resorcinol available from Sumitomo Chemical Co., Ltd. The resorcinol resins may include modified resorcinol resins. Examples of modified resorcinol resins include resorcinol resins in which a part of repeating units is alkylated. Specific examples thereof include penacolite resins B-18-S and B-20 available from INDSPEC Chemical Corporation, Sumikanol 620 available from Taoka Chemical Co., Ltd., R-6 available from Uniroyal, Inc., SRF 1501 available from Schenectady Chemicals, and Arofene 7209 available from Ashland Chemical Co.

Examples of phenolic resins include those that can be obtained by reaction of phenol with aldehydes such as formaldehyde, acetaldehyde, and furfural in the presence of an acid or alkali catalyst. Examples also include modified phenolic resins which are obtained by modifying phenolic resins with compounds such as various animal and vegetable oils (cashew oil, tall oil, linseed oil, etc.), unsaturated fatty acids, rosin, alkylbenzene resins, aniline, and melamine.

Examples of alkylphenolic resins include those that can be obtained by reaction of alkylphenols with the aldehydes in the presence of an acid or alkali catalyst. Examples also include modified alkylphenolic resins which are obtained by modifying alkylphenolic resins with the compounds such as cashew oil. Specific examples of alkylphenolic resins include cresol resin and octylphenol resin.

The crosslinkable resin content (preferably, the combined amount of resorcinol resins, phenolic resins, and alkylphenolic resins) per 100 parts by mass of the rubber component is preferably not more than 1.99 parts by mass, more preferably not more than 1.0 part by mass, still more preferably not more than 0.5 parts by mass, particularly preferably not more than 0.1 parts by mass, and most preferably 0 parts by mass (substantially no content).

As described above, the crosslinkable resin content can be reduced in the rubber composition of the present invention. Thus, the amount of partial condensates of hexamethoxymethylolmelamine (HMMM) and partial condensates of hexamethylol melamine pentamethyl ether (HMMPME), which are methylene donors, can also be reduced.

The combined amount of partial condensates of HMMM and partial condensates of HMMPME per 100 parts by mass of the rubber component is preferably not more than 2.0 parts by mass, more preferably not more than 1.0 part by mass, still more preferably not more than 0.5 parts by mass, particularly preferably not more than 0.1 parts by mass, and most preferably 0 parts by mass (substantially no content).

The rubber composition of the present invention preferably contains carbon black. This provides good reinforcement and can synergistically improve the balance of the above properties. Thus, the effects of the present invention can be favorably achieved.

Any carbon black can be used. The effects of the present invention (particularly, the effects of improving the handling stability, fuel economy, and elongation at break) are more suitably achieved with the use of carbon black that can easily adsorb sulfur and thus suitably prevent blooming of sulfur.

The carbon black preferably has a nitrogen adsorption specific surface area ($N_2SA$) of not less than 27 $m^2/g$, more preferably not less than 70 $m^2/g$. If the $N_2SA$ is less than 27 $m^2/g$, the elongation at break and handling stability may be insufficient. The $N_2SA$ is preferably not more than 120 $m^2/g$, and more preferably not more than 100 $m^2/g$. If the $N_2SA$ is more than 120 $m^2/g$, the fuel economy may be insufficient.

Herein, the $N_2SA$ of carbon black is determined in accordance with JIS K 6217-2:2001.

The carbon black content per 100 parts by mass of the rubber component is preferably not less than 20 parts by mass, more preferably not less than 30 parts by mass, and still more preferably not less than 40 parts by mass. Also, the carbon black content is preferably not more than 70 parts by mass, and more preferably not more than 60 parts by mass. The above properties can be favorably achieved when the carbon black content is in a range as specified.

The rubber composition of the present invention preferably contains silica. This provides good reinforcement, and also suitably prevents blooming of sulfur as the silica adsorbs sulfur. As a result, the balance of the above properties (particularly, handling stability, fuel economy, elongation at break, adhesion to fiber cords, and processability) can be synergistically improved. Thus, the effects of the present invention are more suitably achieved.

Any silica can be used. Examples thereof include dry silica (anhydrous silica) and wet silica (hydrous silica). Wet silica is preferred because it has many silanol groups.

The silica preferably has a nitrogen adsorption specific surface area ($N_2SA$) of not less than 100 $m^2/g$, more preferably not less than 110 $m^2/g$. If the $N_2SA$ is less than 100 $m^2/g$, the elongation at break tends to decrease. The $N_2SA$ is preferably not more than 250 $m^2/g$, and more preferably not more than 230 $m^2/g$. If the $N_2SA$ is more than 250 $m^2/g$, the fuel economy and processability tend to decrease.

The $N_2SA$ of silica is a value determined by the BET method in accordance with ASTM D3037-93.

The silica content per 100 parts by mass of the rubber component is preferably not less than 3 parts by mass. If the content is less than 3 parts by mass, the adhesion to fiber cords (particularly after wet heat degradation) may be reduced. Also, the silica content is preferably not more than 15 parts by mass, and more preferably not more than 10 parts by mass. If the content is more than 15 parts by mass, the handling stability may decrease and the processability may also decrease due to factors such as shrinkage of the calendered fabric.

The carbon black proportion based on a total of 100% by mass of silica and carbon black is preferably not less than 50% by mass, more preferably not less than 60% by mass, and still more preferably not less than 80% by mass. The upper limit of the carbon black proportion is not particularly limited. The carbon black proportion may be 100% by mass, and is preferably not more than 95% by mass. A rubber composition having the above properties in a more balanced manner can be obtained when the carbon black proportion is in a range as specified.

In the rubber composition of the present invention, the softener content per 100 parts by mass of the rubber component is preferably not more than 15 parts by mass, more preferably not more than 12 parts by mass, still more preferably not more than 10 parts by mass, and particularly preferably not more than 8 parts by mass. If the content is more than 15 parts by mass, fiber cords are likely to be coated with oil, which tends to deteriorate the adhesion between fiber cords and rubber. The handling stability may also decrease. Furthermore, the excess softener may induce blooming of sulfur. The lower limit of the softener content is not particularly limited. In the case where the rubber composition of the present invention is applied to a jointless band, the softener content is preferably not more than 1.99 parts by mass, and more preferably not more than 1.90 parts by mass because the effects of the present invention (particularly, the effects of improving the elongation at break, prevention of blooming of sulfur, and tire durability) are then more suitably achieved.

In the present invention, the softener herein refers to process oils, C5 petroleum resins, and C9 petroleum resins. In the present invention, it should be noted that the above-described crosslinkable resins (resorcinol resins, phenolic resins, and alkylphenolic resins) and the later-described coumarone-indene resins are not included in the softener.

The process oil refers to petroleum oils that are added separately from the rubber component and the like in order to improve rubber processability (such as softening effect, component-dispersing effect, and lubricating effect). The process oil does not include pre-mixed oils in other components such as HMMPME, insoluble sulfur, and oil extended rubber. Examples of process oils include paraffinic oils, naphthenic oils, and aromatic oils.

Examples of C5 petroleum resins include aliphatic petroleum resins made mainly from olefins and diolefins in C5 fraction obtained by naphtha cracking. Examples of C9 petroleum resins include aromatic petroleum resins made mainly from vinyltoluene, indene, and methylindene in C9 fraction obtained by naphtha cracking.

The C5 and C9 petroleum resins each preferably have a softening point of not lower than 50° C., more preferably not lower than 80° C. The softening point is preferably not higher than 150° C., and more preferably not higher than 130° C. The above properties can be favorably achieved when the softening point is in a range as specified.

The rubber composition of the present invention preferably contains a coumarone-indene resin. This provides good adhesion to fiber cords, elongation at break, and tire durability, and can thus synergistically improve the balance of the above properties. In particular, coumarone-indene resins (liquid coumarone-indene resins) having a softening point in the range described below also provide good fuel economy. This is presumably because a moderate polarity and mobility of the coumarone-indene resin promote the dispersion of sulfur and vulcanization accelerator, which in turn promotes uniform crosslinking of sulfur. Additionally, the coumarone-indene resin causes no blooming of sulfur, and also functions as a surface tension reducing agent that contributes to better adhesion between fiber cords and the topping rubber.

The coumarone-indene resin preferably has a softening point of not lower than −20° C., more preferably not lower than 0° C. The softening point is preferably not higher than 60° C., more preferably not higher than 35° C., and still more preferably not higher than 15° C. The above properties can be favorably achieved when the softening point is in a range as specified.

The softening point of a coumarone-indene resin, which is measured as set forth in JIS K 6220-1:2001 with a ring and ball softening point apparatus, is the temperature at which the ball drops down.

The coumarone-indene resin content per 100 parts by mass of the rubber component is preferably not less than 0.5 parts by mass, and more preferably not less than 1.5 parts by mass. Also, the content is preferably not more than 10 parts by mass, and more preferably not more than 8 parts by mass. The effects of the present invention can be more favorably achieved when the coumarone-indene resin content is in a range as specified.

The rubber composition of the present invention preferably contains an antioxidant. This suppresses oxygen- or ozone-induced polymer degradation on the surface of the calendered fabric (topping rubber) before building and assembly. This also suppresses the conversion of insoluble sulfur to soluble sulfur, thus preventing blooming of sulfur.

Although any antioxidant can be used, quinolinic antioxidants are preferred because they have a small amount of amine which induces blooming of sulfur. The present inventor has also found, as a result of studies, that the primary amine (i.e., unreacted monomer) contained in a quinolinic antioxidant particularly induces blooming of sulfur and thus decreases the adhesion to fiber cords, processability, and tire durability. Hence, the primary amine content based on 100% by mass of the quinolinic antioxidant is preferably not more than 0.7% by mass, and more preferably not more than 0.65% by mass. The lower limit of the content is not particularly limited, and the content is preferably not less than 0.2% by mass in terms of productivity during manufacturing.

The primary amine content in the antioxidant can be measured by the following method.

A p-dimethylamino benzaldehyde (DAB) solution (10 g/L) is mixed with each of aniline solutions having different concentrations. After 30 minutes or longer, the absorbance of the mixed solution is measured at 440 nm. At that time, calibration is performed based on the absorbance of the reagent blank. Then, the measured absorbances (calibrated absorbances) are plotted against the aniline concentrations to prepare a standard curve.

Next, an antioxidant (0.20 g) is mixed with chloroform (50 mL) and 7% hydrochloric acid (50 mL). The resulting mixture is shaken for about 10 minutes and allowed to stand still for about 1 hour. Subsequently, the upper layer (7% hydrochloric acid) of the mixed solution is separated and the separated solution is mixed with the DAB solution. After 30 minutes or longer, the absorbance of the resulting mixture is measured at 440 nm. At that time, calibration is performed based on the absorbance of the reagent blank. Then, the primary amine content is calculated from the calibrated absorbance and the standard curve.

The antioxidant (preferably, quinolinic antioxidant) content per 100 parts by mass of the rubber component is preferably not less than 0.5 parts by mass, and more preferably not less than 0.7 parts by mass. Also, the content is preferably not more than 3.0 parts by mass, and more preferably not more than 2.0 parts by mass. The effects of the present invention can be favorably achieved when the antioxidant content is in a range as specified.

The rubber composition of the present invention preferably contains a vulcanization accelerator. Examples of vulcanization accelerators include guanidine compounds, aldehyde-amine compounds, aldehyde-ammonia compounds, thiazole compounds, sulfenamide compounds, thiourea compounds, thiuram compounds, dithiocarbamate compounds, and xanthate compounds. These vulcanization accelerators may be used alone or in combinations of two or more. Preferred among these in view of obtaining good adhesion to fiber cords are the sulfenamide vulcanization accelerators (such as N-tert-butyl-2-benzothiazolyl sulfenamide (TBBS), N-cyclohexyl-2-benzothiazolyl sulfenamide (CBS), N,N-dicyclohexyl-2-benzothiazolyl sulfenamide (DCBS), and N,N-diisopropyl-2-benzothiazole sulfenamide (TBSI)), with TBBS and CBS being more preferred.

The vulcanization accelerator content per 100 parts by mass of the rubber component is preferably not less than 0.3 parts by mass, more preferably not less than 0.5 parts by mass, and still more preferably not less than 0.8 parts by mass. If the content is less than 0.3 parts by mass, the handling stability and adhesion to fiber cords may be insufficient. The content is preferably not more than 4 parts by mass, more preferably not more than 3 parts by mass, still more preferably not more than 2 parts by mass, and particularly preferably not more than 1.5 parts by mass. If the content is more than 4 parts by mass, the adhesion to fiber cords (particularly after wet heat degradation) tends to decrease.

The rubber composition of the present invention can be prepared by any known method such as those in which the above components are kneaded using a rubber kneader such as an open roll mill or Banbury mixer, followed by vulcanization.

The rubber composition of the present invention is used as a rubber composition for a fiber cord topping (rubber composition for topping). In particular, the rubber composition can be suitably used as a rubber composition for a carcass topping, a rubber composition for a jointless band topping, and a rubber composition for a canvas chafer topping.

Examples of fiber cords include cords formed from fibers such as polyethylene, nylon, aramid, glass fiber, polyester, rayon, and polyethylene terephthalate. Hybrid cords formed from a plurality of different fibers may also be used. Examples of hybrid cords include nylon/aramid hybrid cords.

The rubber composition of the present invention coats fiber cords to form a topped fiber cord component. Specifically, the rubber composition for a carcass topping, the rubber composition for a jointless band topping, and the rubber composition for a canvas chafer topping coat fiber cords to form a carcass, a jointless band, and a carcass chafer (chafer made of rubberized fabric), respectively.

The carcass is generally formed from polyester cords, whereas the jointless band and the canvas chafer are generally formed from nylon cords. The jointless band may also be formed from aramid cords or nylon/aramid hybrid cords.

The carcass is a component formed from fiber cords and a fiber cord topping rubber layer. Specifically, it is a component shown in FIG. 1 of JP-A 2008-75066 (which is incorporated by reference in the entirety), for example.

The jointless band is a component formed from fiber cords and a fiber cord topping rubber layer. It is disposed on the outside of a breaker in the radial direction of the tire in order to suppress separation of the breaker from the carcass by the centrifugal force of the tire during driving the vehicle. Specifically, it is a component shown in FIG. 3 of JP-A 2009-007437 (which is incorporated by reference in the entirety), for example.

The canvas chafer is a component formed from fiber cords and a fiber cord topping rubber layer. It is disposed around a bead and it comes into contact with a rim when the tire is mounted on the rim. Specifically, it is a component shown in FIGS. 1 to 6 of JP-A 2010-52486, FIGS. 1 and 2 of JP-A 2009-127144, FIGS. 1 and 5 of JP-A 2009-160952, and FIGS. 1 and 2 of JP-A 2007-238078 (which are incorporated by reference in their entirety), for example.

The pneumatic tire of the present invention can be produced from the rubber composition described above by any ordinary method.

Specifically, an unvulcanized rubber composition containing the above-described components is formed into a sheet, and the sheets are press-bonded to the top surface and the bottom surface, respectively, of fiber cords, and then rolled to prepare a fabric with cords (topped fiber cord component (total thickness: about 1.00-2.00 mm; the cord species, the endcount, and the rubber content vary depending on applications)). The resulting fabric is assembled with other tire components in an ordinary manner in a tire building machine to build an unvulcanized tire. This unvulcanized tire is then heat-pressed in a vulcanizer to obtain a tire. The topped fiber cord component is preferably a carcass, a jointless band, and/or a canvas chafer.

The pneumatic tire of the present invention can be suitably used as a tire for passenger vehicles, a tire for light trucks, and a tire for motorcycles.

EXAMPLES

The present invention is more specifically described with reference to non-limiting examples.

The chemical agents used in the examples and comparative examples are listed below.
<NR>: TSR20
<IR>: IR2200 available from JSR CORPORATION
<SBR>: SBR1502 (styrene content: 23.5% by mass) available from Sumitomo Chemical Co., Ltd.
<Silica>: ULTRASIL VN3 ($N_2$SA: 175 m$^2$/g) available from Degussa
<Carbon black 1>: Diablack N326 ($N_2$SA: 84 m$^2$/g, DBP: 74 mL/100 g, $N_2$SA/DBP=1.14) available from Mitsubishi Chemical Corporation
<Carbon black 2>: Diablack N220 ($N_2$SA: 115 m$^2$/g, DBP: 114 mL/100 g, $N_2$SA/DBP=1.01) available from Mitsubishi Chemical Corporation
<Carbon black 3>: Diablack N330 ($N_2$SA: 78 m$^2$/g, DBP: 102 mL/100 g, $N_2$SA/DBP=0.76) available from Mitsubishi Chemical Corporation
<Antioxidant>: purified Nocrac 224 (trial product (quinolinic antioxidant), primary amine content: 0.6% by mass) available from Ouchi Shinko Chemical Industrial Co., Ltd.
<C5 petroleum resin>: Marukarez T-100AS (C5 petroleum resin: aliphatic petroleum resin made mainly from olefins and diolefins in C5 fraction obtained by naphtha cracking) (softening point: 100° C.) available from Maruzen Petrochemical Co., Ltd.
<TDAE oil>: Vivatec 500 (aromatic oil) available from H&R
<Mineral oil>: Process P-200 (process oil) available from Japan Energy Corporation
<Liquid coumarone-indene resin>: NOVARES C10 (coumarone-indene resin; softening point: 5° C. to 15° C.) available from Rutgers Chemicals
<Zinc oxide>: zinc oxide #2 available from MITSUI MINING & SMELTING CO., LTD.
<Stearic acid>: Tsubaki available from NOF Corporation
<Insoluble sulfur A>: modified Crystex HSOT 20 (trial product; insoluble sulfur containing 80% by mass of sulfur and 20% by mass of oil; iron content: 15 ppm) available from Flexsys
<Insoluble sulfur B>: IS-HS-7520 (insoluble sulfur containing 80% by mass of sulfur and 20% by mass of oil; iron content: 50 ppm) available from Shanghai Jinghai Chemical (China)
<Insoluble sulfur C>: IS-HS-7520 (different lot of the insoluble sulfur B; insoluble sulfur containing 80% by mass of sulfur and 20% by mass of oil; iron content: 200 ppm) available from Shanghai Jinghai Chemical (China)
<Powdered sulfur>: 5% oil-treated powdered sulfur available from Hosoi Chemical Industry Co., Ltd.
<Vulcanization accelerator>: Nocceler CZ (N-cyclohexyl-2-benzothiazolyl sulfenamide) available from Ouchi Shinko Chemical Industrial Co., Ltd.
<HMMPME>: Sumikanol 507A (modified etherified methylol melamine resin (partial condensate of hexamethylol melamine pentamethyl ether (HMMPME)), (active ingredient content: 65% by mass; silica: 32% by mass; paraffinic oil: 3% by mass)) available from Sumitomo Chemical Co., Ltd.
<Modified resorcinol resin>: Sumikanol 620 (modified resorcinol resin (modified resorcinol-formaldehyde condensate)) available from Taoka Chemical Co., Ltd.

In accordance with each of the formulations shown in Tables 1 and 2 (the numbers in the parentheses for the sulfur content each indicate the net sulfur content), the chemical agents except the sulfur and vulcanization accelerator were kneaded using a 1.7-L Banbury mixer at a discharge temperature of 150° C. for 5 minutes to obtain a kneaded mixture. Next, the sulfur and vulcanization accelerator were added to and kneaded with the kneaded mixture in a roll mill at the maximum rubber temperature of 105° C. for 4 minutes to obtain an unvulcanized rubber composition. The unvulcanized rubber composition was press-vulcanized at 170° C. for 12 minutes to obtain a vulcanized rubber composition.

Separately, the unvulcanized rubber composition was used to coat fiber cords to form a carcass, a jointless band, and a canvas chafer, which were then assembled with other tire components into an unvulcanized tire. The unvulcanized tire was press-vulcanized at 170° C. for 12 minutes to prepare a test tire for commercial trucks (tire size: 225/70R16 117/115).

Separately, the unvulcanized rubber composition was also formed into a rubber sheet (thickness: 0.38 mm). The rubber sheet was then used to coat fiber cords (polyester cords (raw materials: terephthalic acid and ethylene glycol) available from TEIJIN LIMITED; 1670 dtex/2; cord diameter: 0.66 mm) from the top and the bottom, and the coated fiber cords were press-vulcanized at 180° C. for 40 minutes to prepare a sample for peeling test.

Moreover, the thus obtained vulcanized rubber compositions and samples for peeling test were subjected to wet heat degradation at a temperature of 80° C. and a relative humidity of 95% for 150 hours to obtain the respective wet heat-degraded products.

Separately, the vulcanized rubber compositions were subjected to dry heat degradation (air oxidative degradation) in a dry oven at a temperature of 80° C. for 96 hours to obtain dry heat-degraded products.

The unvulcanized rubber compositions, the vulcanized rubber compositions (brand new products, wet heat-degraded products, and dry heat-degraded products), the samples for peeling test (brand new samples and wet heat-degraded samples), and the test tires for commercial trucks were evaluated as described below. Tables 1 and 2 show the results.
(Tire Durability (Heavy Load Durability Drum Test))

The test tire for commercial trucks at 230% of the maximum load (maximum internal pressure) as specified in JIS was run on a drum at a speed of 20 km/h. The running distance until the occurrence of bulging in the bead or tread portion was measured, and the measurement was expressed as an index relative to that of Comparative Example 1 (=100). A higher index indicates better tire durability.

(Viscoelasticity Test)

The complex elastic modulus E* (MPa) and loss tangent tan δ of the vulcanized rubber composition (brand new product) were measured using a viscoelasticity spectrometer VES available from Iwamoto Seisakusho Co., Ltd. at a temperature of 70° C.; a frequency of 10 Hz; an initial strain of 10%; and a dynamic strain of 2%. A higher E* indicates higher rigidity and better handling stability. A lower tan δ indicates less heat build-up and better fuel economy.

(Tensile Test)

Using No. 3 dumbbell test pieces prepared from the vulcanized rubber compositions (brand new product and dry heat-degraded product), a tensile test was carried out at room temperature in accordance with JIS K 6251 "Rubber, vulcanized or thermoplastic—Determination of tensile stress-strain properties," and the elongation at break EB (%) was measured. Higher EB indicates better elongation at break.

(Adhesion Test (Score of Rubber Coverage after Peeling): Adhesion to Fiber Cords)

The test pieces (samples for peeling test (brand new sample and wet heat-degraded sample)) were subjected to an adhesion test to measure the rubber coverage ratio after peeling (percentage of the peeling surface covered with rubber after the rubber was peeled from the fiber cords). The results were presented on a 5-point scale. A score of 5 points indicates the full coverage, and a score of 0 points indicates no coverage. A higher score indicates better adhesion to fiber cords.

(Processability (Extrusion Processability))

Each of the unvulcanized rubber compositions was extruded and formed into a sheet, and the sheet was subjected to sensory evaluation visually and by touch on a 5-point scale for five indicators listed below. A higher value indicates better extrusion processability.

(1) Tackiness of the sheet surface (evaluated throughout the period from immediately after forming the sheet to after allowing the sheet to stand at room temperature for one day)

(2) White blooming caused by deposits such as sulfur and zinc stearate (3) Compound scorch (4) Flatness (5) Edge profile As for the edge profile, the straightest and smoothest edges were regarded as being good. As for the compound scorch, each formed product was cut to prepare a 15 cm square sheet having a thickness of 2 mm. If such a sheet had no irregularities due to cured bits, it was regarded as being good. As for the flatness, if such a sheet was flat enough to adhere tightly to a flat plate, it was regarded as being good.

(Cost)

The following materials are listed in the order from most expensive to least expensive in terms of the unit price: metal (Zn) having a high specific gravity, complicated organic compounds (modified resorcinol resin and HMMPME), organic compounds synthesized in about 5 steps (vulcanization accelerator and antioxidant)>organic materials (NR, SBR, and C5 petroleum resin)>sulfur>silica>carbon black>oil. Reduced use of materials having a high unit cost leads to a lower formulation cost. The formulation cost was evaluated as follows.

Least expensive 5 4 3 2 1 Most expensive

TABLE 1

|  |  |  | Comparative Examples | | | | | | | | |
|---|---|---|---|---|---|---|---|---|---|---|---|
|  |  |  | 1 | 2 | 3 | 4 | 5 | 6 | 7 | 8 | 9 |
| Formulation (part(s) by mass) |  | NR | 70 | 70 | 70 | 70 | 70 | 50 | 50 | 70 | 70 |
|  |  | IR | — | — | — | — | — | 20 | 20 | — | — |
|  |  | SBR | 30 | 30 | 30 | 30 | 30 | 30 | 30 | 30 | 30 |
|  | Filler | Silica | — | — | — | — | — | — | — | — | — |
|  |  | Carbon black 1 (N326, BET84, DBP74, BET/DBP = 1.14) | 45 | 45 | 45 | 55 | 42 | 45 | 45 | 45 | 45 |
|  |  | Carbon black 2 (N220, BET115, DBP114, BET/DBP = 1.01) | — | — | — | — | — | — | — | — | — |
|  |  | Carbon black 3 (N330, BET78, DBP102, BET/DBP = 0.76) | — | — | — | — | — | — | — | — | — |
|  |  | Total filler content | 45 | 45 | 45 | 55 | 42 | 45 | 45 | 45 | 45 |
|  | Antioxidant |  | 1 | 1 | 1 | 1 | 1 | 1 | 1 | 1 | 1 |
|  | Softener | C5 petroleum resin | 2 | 2 | 2 | 2 | 2 | 2 | 2 | 2 | 2 |
|  |  | TDAE oil | 8 | 8 | 8 | 8 | 8 | 8 | 8 | 8 | 8 |
|  |  | Mineral oil | — | — | — | — | — | — | — | — | — |
|  |  | Liquid coumarone-indene resin | — | — | — | — | — | — | — | — | — |
|  |  | Zinc oxide | 3 | 3 | 3 | 3 | 3 | 1.4 | 16 | 6 | 6 |
|  |  | Stearic acid | 2 | 2 | 2 | 2 | 2 | 2 | 2 | 2 | 2 |
|  | Crosslinker | Insoluble sulfur A | — | — | — | 2.4 (1.92) | 4.5 (3.6) | 3.75 (3.0) | 3.75 (3.0) | — | — |
|  |  | Insoluble sulfur B | 3.75 (3.0) | — | — | — | — | — | — | 3.75 (3.0) | — |
|  |  | Insoluble sulfur C | — | 3.75 (3.0) | — | — | — | — | — | — | 3.75 (3.0) |
|  |  | Powdered sulfur | — | — | 3.13 (2.97) | — | — | — | — | — | — |
|  |  | Total net sulfur content | 3.00 | 3.00 | 2.97 | 1.92 | 3.60 | 3.00 | 3.00 | 3.00 | 3.00 |
|  |  | Zinc oxide content/Total net sulfur content | 1.00 | 1.00 | 1.01 | 1.56 | 0.83 | 0.47 | 5.33 | 2.00 | 2.00 |
|  |  | Vulcanization accelerator | 1.0 | 1.0 | 1.0 | 1.0 | 1.0 | 1.0 | 1.0 | 1.0 | 1.0 |
|  |  | HMMPME | — | — | — | — | — | — | — | — | — |
|  |  | Modified resorcinol resin | — | — | — | — | — | — | — | — | — |

TABLE 1-continued

|  |  | Comparative Examples | | | | | | | | |
|---|---|---|---|---|---|---|---|---|---|---|
|  |  | 1 | 2 | 3 | 4 | 5 | 6 | 7 | 8 | 9 |
| Evaluation results | Tire durability (heavy bad durability drum test) (Target: ≥105) | 100 | 90 | 75 | 85 | 50 | 40 | 100 | 90 | 80 |
|  | Handling stability (E* (MPa) at 70° C., Target: 4.8-6.0) | 5.34 | 5.37 | 5.44 | 5.22 | 5.54 | 5.12 | 5.65 | 5.41 | 5.37 |
|  | Fuel economy (tan δ at 70° C., Target: ≤0.13) | 0.122 | 0.121 | 0.132 | 0.155 | 0.127 | 0.132 | 0.112 | 0.119 | 0.118 |
|  | Elongation at break (brand new product) (EB % at RT) (Target: >450) | 495 | 485 | 445 | 535 | 365 | 435 | 485 | 475 | 485 |
|  | Elongation at break (dry heat-degraded product) (EB % at RT) (Target: >250, higher level: >330) | 285 | 245 | 235 | 325 | 225 | 265 | 245 | 295 | 245 |
|  | Adhesion to fiber cords (brand new sample) (Target: ≥3.0) | 3 | 2 | 2 | 2 | 4 | 2 | 4 | 3 | 2 |
|  | Adhesion to fiber cords (wet heat-degraded sample) (Target: ≥3.0) | 2 | 2− | 2− | 1 | 3+ | 2 | 4 | 2 | 2− |
|  | Extrusion processability (Target: ≥3.0) | 2 | 2 | 1 | 4 | 4 | 4 | 3+ | 3 | 2 |
|  | Cost (least expensive 5 4 3 2 1 most expensive) | 4 | 4 | 4 | 5 | 4 | 5 | 1 | 2 | 2 |

TABLE 2

|  |  |  | Examples | | | | | | | |
|---|---|---|---|---|---|---|---|---|---|---|
|  |  |  | 1 | 2 | 3 | 4 | 5 | 6 | 7 | 8 |
| Formulation (part(s) by mass) |  | NR | 70 | 70 | 70 | 70 | 70 | 50 | 70 | 70 |
|  |  | IR | — | — | — | — | — | 20 | — | — |
|  |  | SBR | 30 | 30 | 30 | 30 | 30 | 30 | 30 | 30 |
|  | Filler | Silica | — | — | — | — | — | 5 | 5 | — |
|  |  | Carbon black 1 (N326, BET84, DBP74, BET/DBP = 1.14) | 45 | 48 | — | 45 | 45 | 40 | 40 | 45 |
|  |  | Carbon black 2 (N220, BET115, DBP114, BET/DBP = 1.01) | — | — | 38 | — | — | — | — | — |
|  |  | Carbon black 3 (N330, BET78, DBP102, BET/DBP = 0.76) | — | — | — | — | — | — | — | — |
|  |  | Total filler content | 45 | 48 | 38 | 45 | 45 | 45 | 45 | 45 |
|  |  | Antioxidant | 1 | 1 | 1 | 1 | 1 | 1 | 1 | 1 |
|  | Softener | C5 petroleum resin | 2 | 2 | 2 | 2 | 2 | 2 | 2 | 2 |
|  |  | TDAE oil | 8 | 8 | 8 | 8 | 8 | 8 | 8 | 8 |
|  |  | Mineral oil | — | — | — | — | — | — | — | — |
|  |  | Liquid coumarone-indene resin | — | — | — | — | — | — | — | — |
|  |  | Zinc oxide | 3 | 4 | 3 | 4 | 4 | 2 | 2 | 4 |
|  |  | Stearic acid | 2 | 2 | 2 | 2 | 2 | 2 | 2 | 2 |
|  | Crosslinker | Insoluble sulfur A | 3.75 (3.0) | 3.13 (2.5) | 4.37 (3.5) | 2.25 (1.8) | 1.6 (1.28) | 3.75 (3.0) | 3.75 (3.0) | 2.2 (1.76) |
|  |  | Insoluble sulfur B | — | — | — | — | — | — | — | — |
|  |  | Insoluble sulfur C | — | — | — | — | — | — | — | 1.55 (1.24) |
|  |  | Powdered sulfur | — | — | — | 1.26 (1.20) | 1.8 (1.71) | — | — | — |
|  |  | Total net sulfur content | 3.00 | 2.50 | 3.50 | 3.00 | 2.99 | 3.00 | 3.00 | 3.00 |
|  |  | Zinc oxide content/Total net sulfur content | 1.00 | 1.60 | 0.86 | 1.33 | 1.34 | 0.67 | 0.67 | 1.33 |
|  |  | Vulcanization accelerator | 1.0 | 1.3 | 0.7 | 1.0 | 1.0 | 1.0 | 1.0 | 1.0 |
|  |  | HMMPME | — | — | — | — | — | — | 1.2 | — |
|  |  | Modified resorcinol resin | — | — | — | — | — | — | 1.0 | — |
| Evaluation results | Tire durability (heavy bad durability drum test) (Target: ≥105) |  | 130 | 110 | 120 | 125 | 115 | 120 | 105 | 105 |
|  | Handling stability (E* (MPa) at 70° C., Target: 4.8-6.0) |  | 5.35 | 4.85 | 5.24 | 5.36 | 5.25 | 4.87 | 5.35 | 5.35 |
|  | Fuel economy (tan δ at 70° C., Target: ≤0.13) |  | 0.117 | 0.13 | 0.121 | 0.118 | 0.126 | 0.124 | 0.127 | 0.126 |
|  | Elongation at break (brand new product) (EB % at RT) (Target: >450) |  | 500 | 525 | 465 | 505 | 475 | 465 | 505 | 475 |
|  | Elongation at break (dry heat-degraded product) (EB % at RT) (Target: >250, higher level: >330) |  | 305 | 315 | 270 | 295 | 265 | 325 | 300 | 260 |
|  | Adhesion to fiber cords (brand new sample) (Target: ≥3.0) |  | 4 | 3+ | 4 | 4 | 4 | 3+ | 4 | 3 |
|  | Adhesion to fiber cords (wet heat-degraded sample) |  | 3+ | 3 | 3+ | 3+ | 3+ | 3 | 4 | 3 |

TABLE 2-continued

|  |  | Examples | | | | | | |
|---|---|---|---|---|---|---|---|---|
|  |  |  |  |  |  |  |  |  |
|  | (Target: ≥3.0) |  |  |  |  |  |  |  |
|  | Extrusion processability (Target: ≥3.0) | 4 | 4 | 4 | 3+ | 3 | 3 | 3 | 3 |
|  | Cost (least expensive 5 4 3 2 1 most expensive) | 4 | 4 | 4 | 4 | 4 | 5 | 3 | 4 |

|  |  |  | Examples | | | | | | |
|---|---|---|---|---|---|---|---|---|---|
|  |  |  | 9 | 10 | 11 | 12 | 13 | 14 | 15 |
| Formulation (part(s) by mass) |  | NR | 40 | 40 | 40 | 40 | 40 | 40 | 40 |
|  |  | IR | 30 | 30 | 30 | 30 | 30 | 30 | 30 |
|  |  | SBR | 30 | 30 | 30 | 30 | 30 | 30 | 30 |
|  | Filler | Silica | — | — | — | — | — | — | 10 |
|  |  | Carbon black 1 (N326, BET84, DBP74, BET/DBP = 1.14) | 42 | 42 | 42 | 42 | 42 | — | 40 |
|  |  | Carbon black 2 (N220, BET115, DBP114, BET/DBP = 1.01) | — | — | — | — | — | — | — |
|  |  | Carbon black 3 (N330, BET78, DBP102, BET/DBP = 0.76) | — | — | — | — | — | 45 | — |
|  |  | Total filler content | 42 | 42 | 42 | 42 | 42 | 45 | 50 |
|  |  | Antioxidant | 1 | 1 | 1 | 1 | 1 | 1 | 1 |
|  | Softener | C5 petroleum resin | 1.8 | — | — | — | — | — | 1.8 |
|  |  | TDAE oil | — | 1.8 | — | — | 1.8 | 1.8 | — |
|  |  | Mineral oil | — | — | 1.8 | — | — | — | — |
|  |  | Liquid coumarone-indene resin | — | — | — | 1.8 | 5 | — | — |
|  |  | Zinc oxide | 3 | 3 | 3 | 3 | 3 | 6 | 6 |
|  |  | Stearic acid | 2 | 2 | 2 | 2 | 2 | 3 | 2 |
|  | Crosslinker | Insoluble sulfur A | 3.75 (3.0) | 3.75 (3.0) | 3.75 (3.0) | 3.75 (3.0) | 3.75 (3.0) | 3.75 (3.0) | 2.75 (2.2) |
|  |  | Insoluble sulfur B | — | — | — | — | — | — | — |
|  |  | Insoluble sulfur C | — | — | — | — | — | — | — |
|  |  | Powdered sulfur | — | — | — | — | — | — | — |
|  |  | Total net sulfur content | 3.00 | 3.00 | 3.00 | 3.00 | 3.00 | 3.00 | 2.20 |
|  |  | Zinc oxide content/Total net sulfur content | 1.00 | 1.00 | 1.00 | 1.00 | 1.00 | 2.00 | 2.73 |
|  |  | Vulcanization accelerator | 1.0 | 1.0 | 1.0 | 1.0 | 1.0 | 1.0 | 1.4 |
|  |  | HMMPME | — | — | — | — | — | 1.2 | 1.75 |
|  |  | Modified resorcinol resin | — | — | — | — | — | 1.0 | 1.5 |
| Evaluation results |  | Tire durability (heavy bad durability drum test) (Target: ≥105) | 140 | 140 | 130 | 150 | 155 | 140 | 165 |
|  |  | Handling stability (E* (MPa) at 70° C., Target: 4.8-6.0) | 5.27 | 5.16 | 5.19 | 5.31 | 5.1 | 5.95 | 5.25 |
|  |  | Fuel economy (tan δ at 70° C., Target: ≤0.13) | 0.105 | 0.101 | 0.099 | 0.094 | 0.089 | 0.118 | 0.129 |
|  |  | Elongation at break (brand new product) (EB % at RT) (Target: >450) | 545 | 535 | 525 | 535 | 575 | 540 | 585 |
|  |  | Elongation at break (dry heat-degraded product) (EB % at RT) (Target: >250, higher level: >330) | 315 | 325 | 305 | 340 | 350 | 315 | 375 |
|  |  | Adhesion to fiber cords (brand new sample) (Target: ≥3.0) | 4+ | 4+ | 4 | 4+ | 4+ | 5 | 5 |
|  |  | Adhesion to fiber cords (wet heat-degraded sample) (Target: ≥3.0) | 4 | 4 | 4 | 4 | 4 | 4 | 4 |
|  |  | Extrusion processability (Target: ≥3.0) | 4 | 4 | 4 | 4 | 4 | 4 | 4 |
|  |  | Cost (least expensive 5 4 3 2 1 most expensive) | 4− | 4− | 4− | 4− | 3 | 3 | 2 |

The handling stability, fuel economy, elongation at break, adhesion to fiber cords, processability, and tire durability were improved in a balanced manner in the examples in which the rubber composition had an amount of insoluble sulfur with an iron content of not more than 30 ppm, calculated as net sulfur in the insoluble sulfur, of 1.0 to 3.5 parts by mass; a total net sulfur content of 2.0 to 3.5 parts by mass; and a zinc oxide content of 1.5 to 6.0 parts by mass, each per 100 parts by mass of a rubber component of the rubber composition.

The invention claimed is:

1. A pneumatic tire, comprising a topped fiber cord component formed from a rubber composition for a fiber cord topping, having
   an amount of insoluble sulfur with an iron content of not more than 30 ppm, calculated as net sulfur in the insoluble sulfur, of 1.0 to 3.5 parts by mass;
   a total net sulfur content of 2.0 to 3.5 parts by mass; and
   a zinc oxide content of 1.5 to 6.0 parts by mass, each per 100 parts by mass of a rubber component of the rubber composition.

2. The pneumatic tire according to claim 1,
   wherein a combined amount of resorcinol resins, phenolic resins, and alkylphenolic resins, if present in the rubber component, is not more than 1.99 parts by mass per 100 parts by mass of the rubber component.

3. The pneumatic tire according to claim 1,
   wherein a combined amount of resorcinol resins, phenolic resins, and alkylphenolic resins, if present in the rubber component, is not more than 1.0 part by mass per 100 parts by mass of the rubber component.

4. The pneumatic tire according to claim 1,
   wherein the rubber composition is substantially free of resorcinol resins, phenolic resins, and alkylphenolic resins.

5. The pneumatic tire according to claim 1,
wherein the rubber composition has a softener content of not more than 1.99 parts by mass per 100 parts by mass of the rubber component.

6. The pneumatic tire according to claim 1,
wherein the topped fiber cord component is at least one of a carcass, a jointless band, and a canvas chafer.

\* \* \* \* \*